No. 609,889. Patented Aug. 30, 1898.
P. E. LITTLE.
DISK HARROW AND CULTIVATOR.
(Application filed Jan. 6, 1898.)
(No Model.) 2 Sheets—Sheet I.
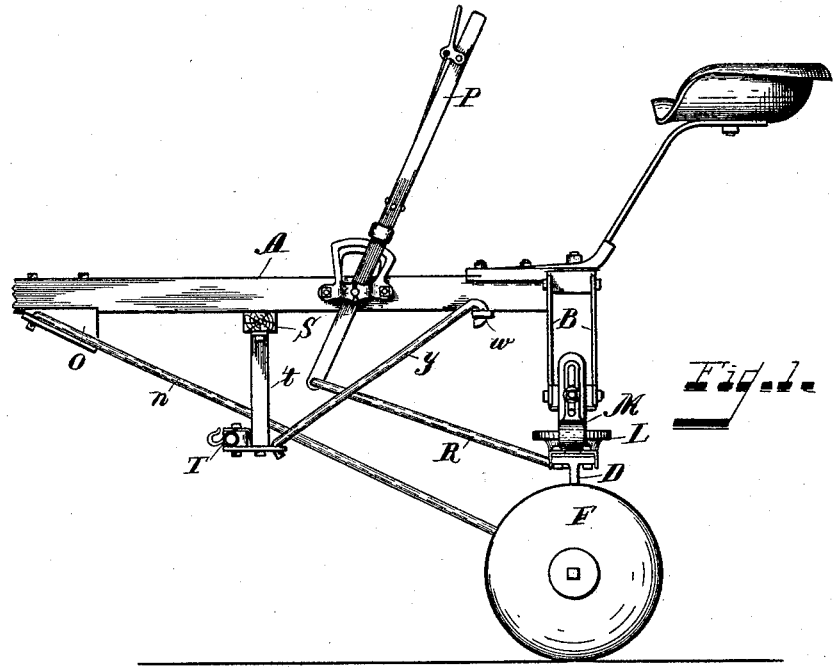
Fig. 1.
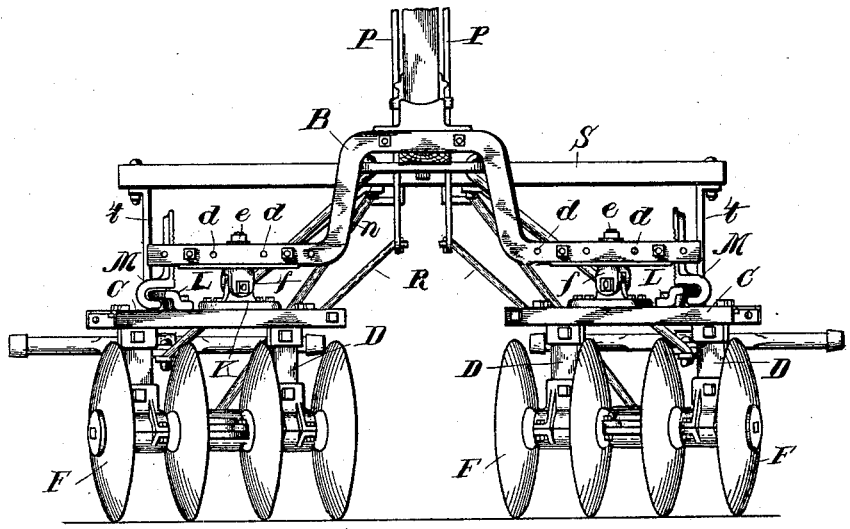
WITNESSES Fig. 2. INVENTOR
Bernard J. Hausfeld. Peter E. Little
N. G. Edwards by Alfred M. Allen
Atty No. 609,889. Patented Aug. 30, 1898.
P. E. LITTLE.
DISK HARROW AND CULTIVATOR.
(Application filed Jan. 6, 1898.)
(No Model.) 2 Sheets—Sheet 2.
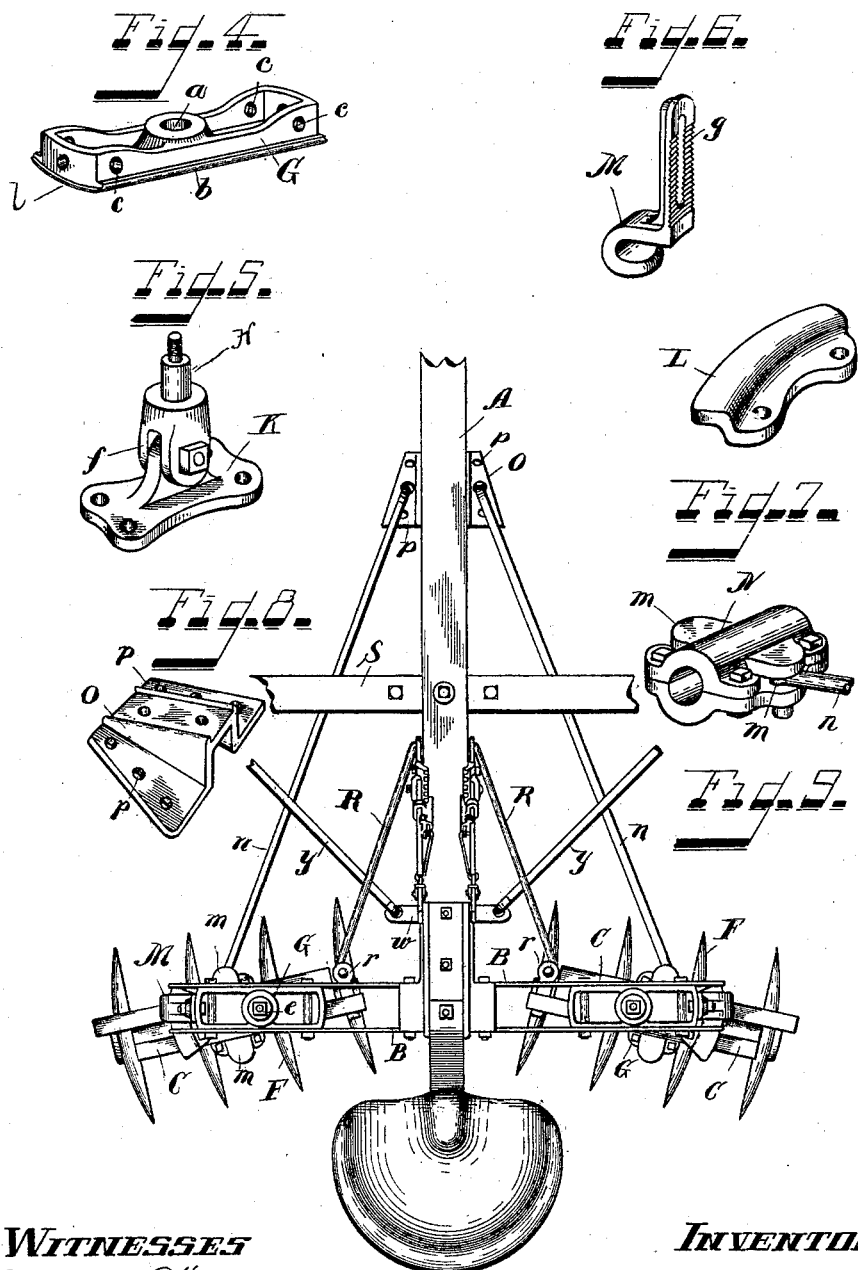
WITNESSES
Bernard J Hausfeld
J. G. Edwards
INVENTOR
Peter E. Little
by Alfred M. Allen
Atty.

UNITED STATES PATENT OFFICE

PETER E. LITTLE, OF DAYTON, OHIO, ASSIGNOR TO THE OHIO RAKE COMPANY, OF SAME PLACE.

DISK HARROW AND CULTIVATOR.

SPECIFICATION forming part of Letters Patent No. 609,889, dated August 30, 1898.

Application filed January 6, 1898. Serial No. 665,781. (No model.)

*To all whom it may concern:*

Be it known that I, PETER E. LITTLE, a citizen of the United States, residing at Dayton, in the county of Montgomery and State of Ohio, have invented certain new and useful Improvements in Disk Harrows and Cultivators, of which the following is a full, clear, and exact description, reference being had to the accompanying drawings, forming part of this specification.

My invention relates to disk harrows arranged to be readily and speedily reversed from an inthrow to an outthrow, or vice versa, as desired, and in which the implement may also be used as a straddle-row cultivator; and the improvements consist of certain novel constructions and arrangements of parts, to be hereinafter more particularly pointed out and claimed.

In the drawings, Figure 1 is a side elevation of the implement. Fig. 2 is a rear elevation of same. Fig. 3 is a top plan view of same. Figs. 4 and 5 are perspective views of the three parts of the hinge for connecting the disk gangs to the main frame. Figs. 6 and 7 are perspective views of the hook and casting for holding down the inner or outer end of the disk gangs. Fig. 8 is a perspective view of the casting for coupling the draft-rods for the disk gangs to the draft-pole; and Fig. 9 is a perspective view of the gang-axle box, to which the inner ends of the draft-rods are coupled.

A is the draft-pole of the implement, securely bolted by suitable plates at right angles to bars B B, which form the main cross-beam of the implement and which are arched, as shown, to allow the implement to straddle the rows of growing plants when used as a cultivator.

C C are angle-iron plates which form the gang-frames and carry the hangers D D, supporting the gang-axles, upon which are strung the concavo-convex disks F F in the usual way.

Each gang is hinged to the main cross-beam in the following manner:

G is a casting provided with a central boss, having a vertical opening $a$ through the same. This casting G is formed with a base flange or lip $b$ and is bolted between the bars B B of the cross-head by bolts passing through the openings $c\ c$, the flange embracing the lower edge of the cross-bars, while a series of bolt-openings $d\ d$ are provided in the cross-bars to allow for lateral adjustment of the casting. Passing through the vertical opening $a$ in the casting G is the pivot-bolt H, held therein by the nut $e$, the lower end of the pivot-bolt being enlarged and provided with ears $f\ f$, by means of which the pivot-bolt is hinged to the plate K which plate is in turn bolted to the upper surfaces of the angle-irons C C, forming the gang-frames. In this way the gangs of disks are pivoted to the main frame, so as to allow a tipping side movement and to permit the gangs to be adjusted to the line of draft or to be entirely reversed, as hereinafter described. Bolted to the upper surface of each disk gang is the flanged plate L, while M is a malleable-iron hook to engage this plate. The shaft of this hook is provided with a vertical slot $g$, by means of which the hook is bolted to the outer end of the casting G, the inner surface of the hook-shaft being ribbed, as shown in Fig. 6, and engaging the rib $l$ on the casting to hold the hook firmly in place, the slot $g$ allowing any vertical adjustment desired.

N is the central journal-box for the gang-axle of each disk gang, and is provided with ears $m\ m$ on each side, within which is hooked the inner end of the draft-rod $n$.

O is a plate bolted to the tongue or draft-pole A and provided with a series of holes $p\ p$, within which the outer end of each draft-rod is attached, the series of holes being provided in the plate to permit the use of but a single draft-rod instead of a number of draft-rods of different lengths.

P P are hand-levers pivoted to a suitable casting on the draft-tongue, one for each disk gang, the levers being held in any desired position in the usual way by the latch engaging a segment-rack. R R are connecting-rods coupling the ends of these levers to the inner ends of the disk gangs, where they are hooked in the eyes $r\ r$ on the inner ends of the gang-frames, similar eyes being provided at opposite ends of the gang-frames.

It will be obvious from the construction above described that the disk gangs cannot only be adjusted at any desired angle to the line of draft, but that an exceedingly effective and simple means is provided for reversing the disks from inthrow to outthrow, or vice versa. In order to reverse the gangs, the operator merely unhooks the draft-rods and lever connecting-rods, and the gangs can be at once reversed, swinging on the pivot-bolts H. The lever-rods and draft-rods are then hooked on the opposite side, as provided, and the implement is ready for use. It will be further evident that the draft on the disk gangs is from the axles of the gangs and not from the axles of the gang-frame, as is usually the case in reversible harrows, thus removing the pulling strain entirely from the hanger connections, while at the same time the draft is more direct and easier on the team, and the neck-weight is obviated to a large extent.

When used as a cultivator the arch of the main cross-beam allows the implement to straddle the rows of growing plants, and the lateral adjustment of the cultivator disk gangs to conform to the varying widths of rows may be held by the adjustment of the casting G, as above described.

In order to allow for ready adaptation for a harrow or cultivator, it is essential that means should be provided not only to hold the disk gangs from tipping at the ends when in use, but also to provide a considerable latitude of side vertical adjustment or tip for the gangs. This is provided for in the hooks M and plates L. When, for example, in cultivating cotton, it is frequently desired to throw the dirt up around the plant, thus forming a little hill with a furrow between the rows to carry off the water. By reversing the disks to cause them to throw in instead of out and tipping the disk gangs the desired result can be readily accomplished.

In view of the fact that the cultivator is arched the draft-pole will necessarily be elevated and throw too much weight on the team were the singletrees attached directly to the draft-pole. Pivoted, therefore, to the under side of the pole is the doubletree S. Depending from the outer ends of the doubletree are the brackets $t\ t$, to the lower ends of which the singletrees T T are coupled, thus bringing the draft of the implement on a line with the top of the disk gangs. The brackets are further braced by the rods $y\ y$, swiveled to the plate $w$ on the draft-pole.

Having thus described my invention, what I claim, and desire to secure by Letters Patent, is—

1. In a harrow and cultivator, the combination, with the main frame and gang-frames vertically pivoted thereto, with hangers and series of disks carried thereby, of draft and lever rods with coupling connections therefor on opposite sides of the disk gangs for the draft-rods at the gang-axles and for the lever-rods at opposite ends of the gang-frames, substantially as shown and described.

2. In a harrow and cultivator, the combination, of the main frame and gang-frames vertically pivoted thereto, with hangers and series of disks carried thereby with journal-boxes therefor, eyes formed on opposite sides of one of said journal-boxes draft-rods hooked therein and to the draft-pole with lever-rods and means for coupling same at opposite ends of the disk gangs, substantially as shown and described.

3. In a harrow and cultivator, the combination, with the main cross-beam of a plate laterally adjustable thereon and provided with a vertical opening, coupling-pin pivoted therein and hinged horizontally to its respective disk gang, substantially as shown and described.

4. In a harrow and cultivator, the combination, with the main cross-beam, of a plate laterally adjustable thereon and provided with a vertical opening coupling-pin pivoted therein and hinged horizontally to its respective disk gang, flanged plate on the disk gang and vertically-adjustable hook secured to said laterally-adjustable plate, substantially as shown and described.

5. In a harrow and cultivator, the combination, with the main cross-beam of a plate laterally adjustable thereon and provided with a vertical opening, coupling-pin pivoted therein and hinged horizontally to its respective disk gang, journal-boxes for the disk gangs, eyes formed on opposite sides of one of said journal-boxes, draft-rods hooked therein and to the draft-pole with lever-rods and means for coupling same at opposite ends of the disk gangs, substantially as shown and described.

6. In a harrow and cultivator, the combination, with the main cross-beam, of a plate laterally adjustable thereon and provided with a vertical opening coupling-pin pivoted therein and hinged horizontally to its respective disk gang, flanged plate on the disk gang and vertically-adjustable hook secured to said laterally-adjustable plate, journal-boxes for the disk gangs eyes formed on opposite sides of one of said journal-boxes, draft-rods hooked therein and to the draft-pole with lever-rods and means for coupling same at opposite ends of the disk gangs, substantially as shown and described.

PETER E. LITTLE.

In presence of—
BESSIE BORNSTEIN,
W. H. H. ECKI.